United States Patent
Keniston

[15] 3,677,112
[45] July 18, 1972

[54] PINCERS
[72] Inventor: John W. Keniston, P. O. Box 151, Franklin, N.H. 03235
[22] Filed: June 8, 1970
[21] Appl. No.: 44,353

[52] U.S. Cl. ...................................................... 81/43
[51] Int. Cl. ........................................................ B25b 9/02
[58] Field of Search ............... 81/43; 128/354; 7/1 P; 294/99

[56] References Cited

UNITED STATES PATENTS

| 2,411,825 | 11/1946 | Ferguson | 128/354 X |
| 2,406,393 | 8/1946 | Neugass | 128/354 |
| 3,293,958 | 12/1966 | Smith | 81/43 |

FOREIGN PATENTS OR APPLICATIONS 690,823   4/1953   Great Britain ............................ 81/43

Primary Examiner—Robert C. Riordon
Assistant Examiner—Roscoe V. Parker, Jr.
Attorney—Edgar H. Kent

[57] ABSTRACT

Pincers have a handle portion formed of plastic and gripping members formed of a different material adhesively united to the plastic of the handle portion. Methods include molding the shanks of the gripping members into the handle portions or adhesively bonding the shanks in sockets in pre-molded handle portions.

4 Claims, 7 Drawing Figures

PATENTED JUL 18 1972 3,677,112

PINCERS

This invention relates to pincers such as tweezers and forceps useful for manipulating small and delicate objects, and particularly to pincers formed in large part at least of plastic.

Pincers made of plastic have been proposed prior to this invention but have failed to attain widespread use for purposes requiring a durable precision instrument, such as the manipulating of minute or delicate parts in the manufacture of electronic equipment. The reason for such failure is, I believe, that no matter what plastic is selected for fabrication of the pincers, they lack one or more of the essential qualities of such instruments which are provided by the conventional, relatively expensive, all-metal variety; e.g., proper spring, durability under all conditions including high and low temperature, strength, lack of bulk, particularly in the jaws (points), accuracy and uniformity of jaw registration.

An object of this invention is to provide pincers at least in large part formed of plastic in which the requisite qualities for the purpose are provided as well as, or better than, by an all-metal construction, and generally at a lesser expense.

In attaining these objects the invention features pincers having the manipulating or handle portion made essentially of a plastic which has all the requisite qualities for that portion and the jaw or point portions made of a different material, which may be metal or plastic, which has different characteristics that are superior to those of the plastic of the handle portion for satisfying the requirements of the jaw or point portions. In the preferred practice of the method the gripping members such as the jaw or point portions are preformed with a shank that is adhesively united with the plastic of the handle portion, either by bonding that plastic itself to the shank during the molding of the handle or by a subsequent ultrasonic bonding treatment, or by an adhesive applied between the shank and the sides of a socket in the formed handle.

The foregoing and other objects and advantages of the invention will be apparent from the following more particular description of preferred embodiments and practices of the invention, taken in conjunction with the accompanying drawings wherein.

Referring to FIGS. 1-4 the pincers there shown has a handle portion designated generally 10 which is of plastic composition and is preferably, for simplicity of manufacture, formed by separately molding the two arms designated generally 12 thereof and bonding them together adjacent one end thereof. It should be understood however that the two arms may be molded integral at one of their ends in a more complex molding operation.

Figure 1:
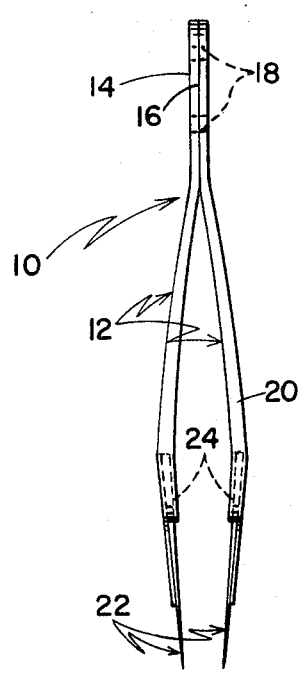
FIG. 1 is a side elevation view of pincers specifically tweezers according to the invention.
Figure 2:
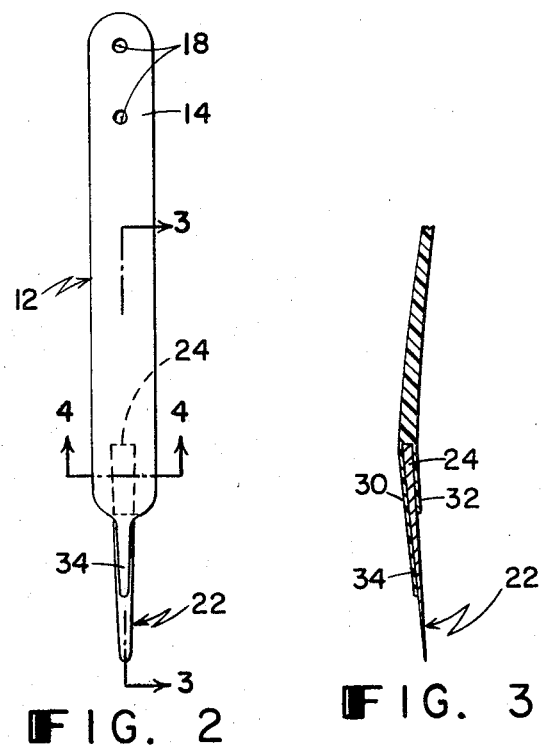
FIG. 2 is a plan view of the outer side of one of the handle arms and of the point united thereto of the embodiment of FIG. 1.
Figure 3:
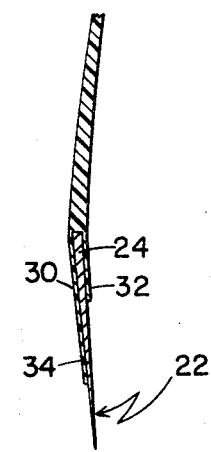
FIG. 3 is a longitudinal section view on line 3—3 of FIG. 2, looking in the direction of the arrows.
Figure 4:
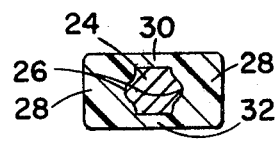
FIG. 4 is an enlarged transverse section view on line 4—4 of FIG. 2, looking in the direction of the arrows.

Each of the arms 12 is formed with a flat end portion 14, portions 14 being bonded together at their opposed faces as indicated at 16 preferably by ultrasonic bonding treatment which causes the plastic on the two faces to unite, although a separately applied adhesive may be used if desired. Apertures 18 formed in portions 16 are in registry when arms 12 are in proper alignment, these apertures being used to receive aligning pins of an assembly tool for obtaining and maintaining proper alignment of the arms during the bonding of the meeting faces of portions 14 thereof. Arms 12 are appropriately bowed toward their opposite ends in portions 20, these ends having adhesively united thereto preformed gripping members designated generally 22 by bonding of the plastic of the arms with the shank portions 24 of the members. As shown members 22 have the conventional shape of the points of tweezers. Preferably, as shown, shank portions 24 enlarge laterally toward their inner ends to provide a positive lock against longitudinal pull-out of the points from the handle in addition to the resistance offered by the bonding of the plastic thereto. Preferably also, as shown in FIG. 4, these portions are formed with a bulge or rib 26 at each side to form a dovetail joint with the plastic at the sides thereof and are completely embedded in the plastic between side portions 28 and thinner outer layer 30 and inner layer 32 thereof, thus providing a structure highly resistant to separation of the points from the arms by force applied in any direction. Also, layer 30 may extend beyond side portions 28 and layer 32 toward the outer ends of the points as shown at 34 to increase the bond area and structural strength of the joint.

Figure 5:
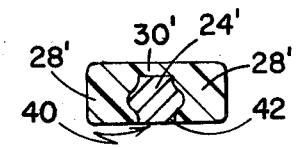
FIG. 5 is a view similar to FIG. 4 showing a modification.

The modification of FIG. 5 differs from that of FIG. 4 in that the shank 24 of the point is seated in a closely fitting socket 40 formed in a pre-molded arm 12 between side portions 28' and under layer 30' and is united to the plastic of the walls of the socket and to an extension of layer 30' corresponding to extension 34 in the previous figures by a thin layer 42 which may be plastic of the handle or a different adhesive bonded to the plastic and to shank 24'. In this embodiment, for ease in molding and assembly, plastic over one surface of shank 24' as layer 32 of the other embodiment, may be omitted.

In a method of forming the embodiment of FIGS. 1-4, an injection mold member 50 (FIG. 6) may be provided having a main cavity 52 therein which conforms to the outside surface shape and the thickness of portions 14 and 20 of an arm 12, being slightly large, with projecting pins 54 for forming apertures 18. An extension 56 of cavity 52 conforms in size, shape and depth to the extension of a point 22 beyond the end of an arm 12, being slightly larger. An indentation 58 in the base of extension 56 corresponds to extension 34 of plastic layer 30. A top mold member (not shown) may have a complementary inner surface, mating mold cavities 52 and 56, which is flat except beyond layer 32 where it steps down to the top level of the remainder of point 22. In this method the preformed point 22 is placed in cavity extension 56 with its shank projecting into cavity 52 as indicated by dotted line 24 so that it is molded into the corresponding handle portion 12 previously described. It is emphasized that the mold cavities, which are normally provided in multiple, should be precision formed particularly at the extension 56 so that the point 22 of each arm will be exactly in the same location for accurate registry of two points when the two arms of a handle are secured together.

Figure 6:
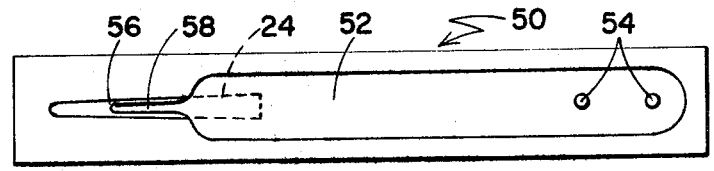
FIG. 6 is a plan view of an injection mold cavity for forming an arm and united point of the embodiment of FIG. 1 according to one method of the invention.
Figure 7:
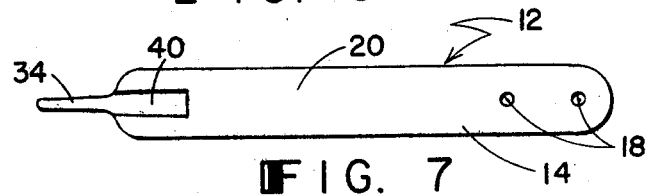
FIG. 7 is a plan view of a pre-molded arm of the embodiment of FIG. 5 before assembling and uniting the point thereto according to other methods of the invention.

In a method of forming the embodiment of FIG. 5 a mold member is provided having a cavity identical with cavity 52 of FIG. 6 but with extension thereof 58 only, extension 56 being omitted. The mating mold member then differs from that utilized in the method illustrated by FIG. 6 in that it has a projection in its under surface corresponding in location and complementary in shape to socket 40 of FIG. 5, except that, for convenience of molding and assembly, socket 40 may be formed without indentations in its sides and without layer 32. The molded handle arm 12 therefore comprises portions 14, 20 and 34 of the embodiment of FIG. 1 and socket 40. In assembling a pre-formed point or jaw to a handle arm according to this method, the shank of the point or jaw is positioned in closely fitting cavity 40 and there held until the bonding layer 42 has been formed either by ultrasonic treatment causing plastic flow to form layer 42 or by the setting of a coating of adhesive pre-applied to the shank.

Various plastics have the requisite properties for use as the molding plastic for forming the handle portion of the pincers according to the invention. Phenolics, nylons, and acetal resins may be regarded as preferred choices, with Delrin, a trademarked acetal resin of the DuPont Company, being a particularly preferred choice. The points may be made of metal such as the conventional stainless steel or may be molded of plastic such as certain polyimide resins that are hard, tough, durable at high and low temperatures and acid resistant, a preferred choice being Vespel, a trademarked resin of the DuPont Company, which will withstand temperatures up to 700° F, has a Rockwell hardness of 79 and a low coefficient of friction and is acid resistant. Various adhesives may be employed for uniting the point or jaw with the plastic of the arm in the FIG. 5 embodiment when a separate adhesive is used, such as some of the epoxy or acrylic cements which are tough and in general form firm bonds with both metal and plastic. A preferred adhesive having the requisite characteristics is a methyl-2-cyanoacrylate available from the Tennessee Eastman Company under the designation EK-910. Like adhesives may be used for joining the flat portion 14 of arms 12 if these are not ultrasonically bonded.

If desired, metal reinforcing can be included in the plastic handle portion, although with the proper choice of plastic this is really not necessary and simply adds to the expense, which in most cases is substantially less than that of all-metal pincers of comparable quality. Also, the gripping members may take any desired or required shape other than the flat tweezer points shown in the illustrated embodiment. Other modifications within the scope of the invention will occur to those skilled in the art.

I claim:

1. Pincers having the manipulating handle portion formed essentially of molded plastic and comprising a pair of joined arms movable toward and away from one another at their outer ends and a pair of opposed gripping members projecting from the outer ends of said arms and being formed of a different material than the plastic forming said arms, said members each having a shank, said arms each having a recess in an outer end portion thereof containing said respective shanks, said outer end portions of said arms having at least substantially the same width as the remainder of the respective arm, said recesses and shanks being correspondingly enlarged toward their inner ends to prevent longitudinal withdrawal of said shanks from said recesses, said shanks being adhesively united with the surrounding plastic of said respective end portions.

2. Pincers according to claim 1 wherein said gripping member shanks are adhesively united with the surrounding plastic by that plastic.

3. Pincers according to claim 1 in which said gripping member shanks and said recesses have sidewalls correspondingly bulged and indented to form dovetail joints.

4. Pincers according to claim 1 wherein each arm end portion has a laterally reduced extension overlying and adhesively united to the outer surface of the corresponding gripping member.

* * * * *